March 17, 1964 K. CECH 3,125,645
MINIATURE SOUND TAPE RECORDER OR THE LIKE
Filed Sept. 12, 1961
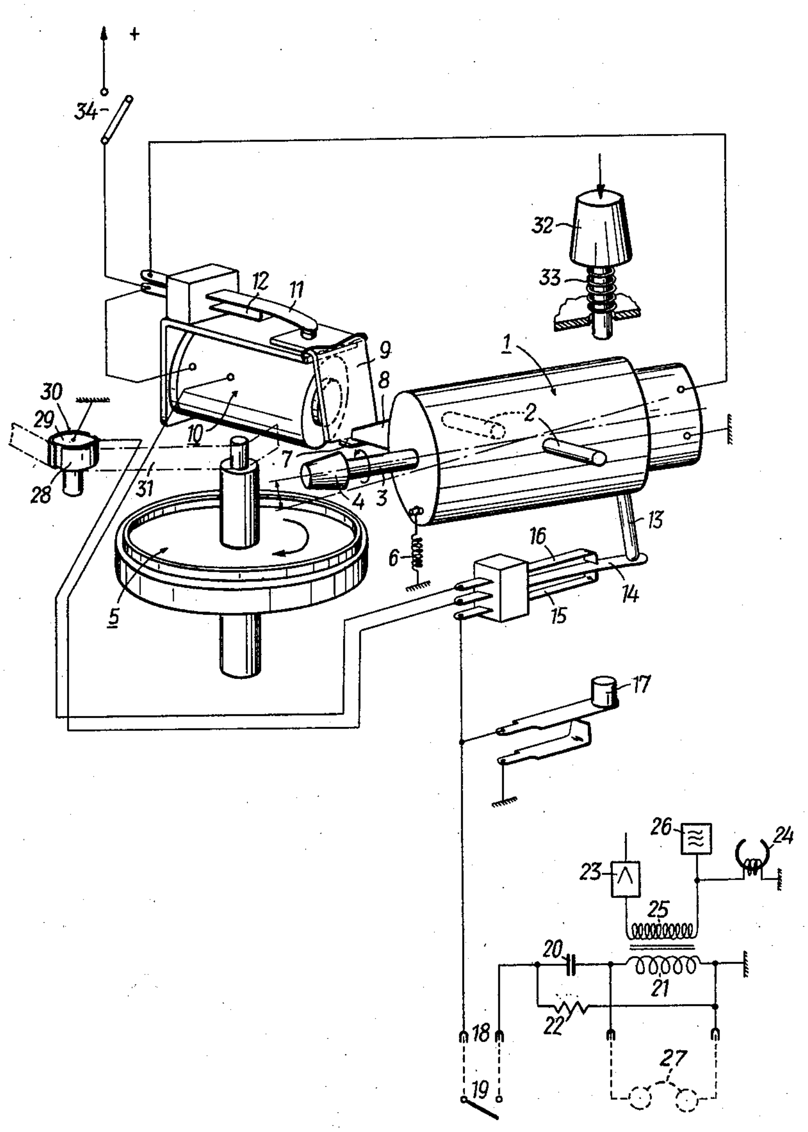
Inventor:
Karl Cech
By Ernest G. Montague
Attorney United States Patent Office 3,125,645

Patented Mar. 17, 1964

3,125,645

MINIATURE SOUND TAPE RECORDER OR THE LIKE

Karl Cech, Modling, near Vienna, Austria, assignor to Karl Vockenhuber, Vienna, Austria Filed Sept. 12, 1961, Ser. No. 137,611
Claims priority, application Austria Sept. 23, 1960
3 Claims. (Cl. 179—100.2)

The present invention relates to a miniature sound tape recorder or the like comprising a driving motor which is swingable about an axis disposed at a right angle to the motor shaft, and which is controlled by an electromagnet, so that the motor shaft is, in its working position, in mesh with the sound tape drive and the driving connection is disengaged in its rest position.

It is known to energize miniature sound tape recorders by built-in batteries, so that they may be operated independently from the mains. In order to assure a sufficient battery life, it is necessary, however, to keep the power demand of the single elements of the recorder as low as possible. This is particularly difficult in case an electrical release of the recorder using an electromagnet is provided.

It is, therefore, one object of the present invention to provide a miniature sound tape recorder in which the electromagnet only starts the releasing process, the energy is taken, however, for a driving connection between the motor shaft and the gear from a mechanical energy reservoir.

It is another object of the present invention to provide a miniature sound tape recorder which comprises a switch arrangement in order to assure that the electromagnet is operative only during the proper releasing process and the electromagnet is then rendered inoperative.

It is a further object of the present invention to provide a miniature sound tape recorder in which an automatic stopping of the driving motor before the entire run-down of the sound tape is ensured by means of terminal contact foils provided on the sound tape.

It is a still further object of the present invention to provide a miniature sound tape recorder which records an impulse on the sound tape upon starting the apparatus, thus facilitating a later working of the sound tape. Such arrangement has a special advantage when the sound tape recorder is simultaneously released with a film camera, and when it is intended to produce a sound film of the individual image and a sound recording.

It is yet another object of the present invention to provide a miniature sound tape recorder including a second release arrangement that avoids an impulse-recording and makes possible a release of the recorder when starting the apparatus.

With these and other objects in view, which will become apparent in the following detailed description, the present invention will be clearly understood in connection with the accompanying drawing, in which the only figure is a perspective schematic view of a driving mechanism of a miniature sound tape recorder.

Referring now to the drawing, a direct-current motor 1 is swingably mounted about a pivot pin 2 and carries a motor shaft 3. In the illustrated position a friction wheel 4, arranged on the motor shaft 3, is lifted from a flywheel 5, which is directly arranged on the capstan of the tape recorder. The motor 1 is retained in this position against the action of a spring 6 by an arm 7, which engages a second arm 8 rigidly mounted on and radially projecting from the casing of the motor 1.

The arm 7 is formed as an extension of a hinged armature 9 of an electromagnet 10. Contact blades 11 and 12 which are mounted on and insulated from the electromagnet 10 operate as spacing contacts, i.e. these contacts break the motor circuit upon excitation of the electromagnet 10. For this purpose the contacts 11 and 12 are inserted in the motor circuit, so that the motor circuit is interrupted upon operation of the electromagnet 10.

A pin 13 of insulating material is mounted on the motor casing for adjusting a movable contact 14 of a throw-over switch having rigid contacts 15 and 16. The contact 14 is connected to one end of the winding of the electromagnet 10, whereas the contact 15 is in connection with a switch 17 and with one socket of a bi-polar plug 18, to which the remote action release switch 19, indicated in dotted lines, may be added.

The second socket of the bi-polar plug 18 is grounded through a condenser 20 and a winding 21 of a transformer. It is the purpose of the condenser 20 to lead only the alternating component of the starting impulse of the electromagnet 10 over the primary transformer winding 21. A resistor 22 is provided in parallel to the condenser 20 and the primary winding 21, in order to assure a flow of direct current. The secondary winding 25 of the transformer is connected with an amplifier 23 and a sound head 24. A high-frequency oscillator 26 is provided for supplying the biasing current for the sound carrier. For the control of the recording, an earphone 27 may be provided and be connected to the primary winding 21.

A shift pin 29 for the sound tape 31 is provided and equipped with a first conducting coat 28 and a second conducting coat 30.

The contact 16 of the throw-over switch, which is controlled by the motor 1, is connected to a conducting coat 28 of the shift pin 29 for the sound tape 31. A second coat 30 of the shift pin 29 is grounded. When a terminal contact, i.e. a conducting foil fixed on the sound tape, arrives at the shift pin 29 during the run-down of the sound tape 31, the coats 28 and 30 are conductively connected, and thereby the electromagnet 10 is excited. The motor circuit is broken by operation of the contacts 11, 12 which are controlled by the armature 9 of the electromagnet 10, and the operation of the motor 1 is stopped.

A knob 32, which is urged by a compression spring 33 into a position spaced apart from the casing of the motor 1, serves the purpose of resetting the motor 1 from its working to its resting position. This is brought about by pressing the knob 32 so that its shaft engages the casing of the motor 1 and causes the motor 1 to turn about the pin 2 from its working position into its resting position, the latter being shown in the drawing.

The entire circuit may be connected to a voltage source, as a battery (not shown) by means of a switch 34.

The mode of operation of the shown arrangement is as follows: First, the battery switch 34 is closed and the motor 1 starts operation. The motor 1 and the friction wheel 4 are, however, still spaced apart from the flywheel 5. When the remote action release switch 19 is closed, the electromagnet 10 is excited, whereby the hinged armature 9 is operated, so that the arm 7 releases the arm 8 radially projecting from the motor casing. The motor 1 swings now into its operative position from its resting position by the action of the spring 6, in which position the friction wheel 4 engages the flywheel 5 and provides a driving connection between the motor shaft 3 and the capstan.

Immediately after the swinging movement of the motor 1, the contact blades 11, 12 are disengaged by further turning of the hinged armature 9, and the motor circuit is opened. Since, however, the pin 13 of the motor 1 releases the contact 14 by the swinging of the motor 1 into its working position, the engagement of the switching contacts 14 and 15 of the throw-over switch is released and the contacts 14 and 16 enter into engagement, whereby the electromagnet 10 is deenergized, and the contacts 11 and 12 are conductively reconnected and render the motor 1 operative again. The interruption of the motor circuit takes place during such a short period of time, that it is hardly noticeable and has no reactive effect on the operation.

By means of the transformer 21, 25 the starting impulse of the electromagnet 10 is superimposed on the low-frequency sound recording. This arrangement is especially valuable, when the remote action release switch 19 is controlled by the release key of a cinematographic camera. The impulse superimposed on the sound recording marks the beginning of the respective scenes, thereby facilitating a later working of the film and the corresponding sound tape.

The switch 17, mounted on the tape recorder itself, is disposed in the circuit in parallel with the remote action release switch 19 and the transformer 21 and 25. The recorder may be started by means of the switch 17 without recording a starting impulse on the sound tape.

The sound tape 31 is driven in known manner by the capstan which is arranged as an extension of the flywheel 5. By pushing down the knob 32, the motor 1 can be restored to its resting position, in which the arm 8 engages the arm 7. When a contact foil secured to the sound tape 31 arrives at the shift pin 29 before the entire run-down of the sound tape, the two conducting coats 28 and 30 are connected, and the electromagnet 10 is excited over the contacts 14 and 16 of the throw-over switch, breaking the motor circuit. By pushing down the knob 32, the unit is reset to its starting or resting position.

The present invention is not restricted to the illustrated embodiment and may be used in miniature sound tape recorders, as well as in cinematographic cameras and similar devices.

For example, it is also possible to provide an electromagnetic resetting arrangement instead of manually resetting of the motor 1 by means of the knob 32. This arrangement has the advantage that the tape can be stopped by remote control, so that the sound tape recorder may be turned on and off by a remote action release switch as often as desired.

In another embodiment, the resetting arrangement for the motor can be driven by the flywheel of the recorder, so that the resetting movement has only to be started electromagnetically, the required energy, however, is supplied by the kinetic energy of the flywheel.

While I have disclosed one embodiment of the present invention, it is to be understood that this embodiment is given by example only and not in a limiting sense, the scope of the present invention being determined by the objects and the claims.

I claim:

1. In a miniature sound tape recorder, a motor having an outer casing and a motor shaft, means for swingably mounting said motor about an axis disposed at a right angle relative to said motor shaft, a capstan including a flywheel adapted to drive a sound tape, a friction wheel carried by said motor shaft and engaging in its operative position said flywheel in order to drive said capstan, spring means tending to swing said motor and thereby said friction wheel into its operative position, means associated with said casing of said motor for retaining the latter in its inoperative position, an electromagnet having an armature pivotally mounted and movable upon energization of said electromagnet, said armature including an arm to operate as an abutment for said retaining means of said casing in the non-energized state of said electromagnet, said arm of said armature being withdrawn upon energization of said electromagnet and permitting said motor to swing into its flywheel engaging position by the action of said spring means, resetting means for returning said motor into its inoperative position, a shift pin adapted to guide said sound tape during its movement through said recorder, said shift pin having two conducting coats surrounding said shift pin and adapted to be conductively connected by a conducting layer of said sound tape, a release circuit, a throw-over switch operated by and responsive to the position of said motor and connecting said electromagnet selectively with said release circuit in the inoperative position of said motor and with said conducting coats of said shift pin in the operative position of said motor, and contact means disposed in the motor circuit and operated by said armature of said electromagnet to open said motor circuit upon energization of said electromagnet, thereby stopping said motor in its operative position, upon conductively connecting said conducting coats.

2. The miniature sound tape recorder, as set forth in claim 1, wherein said release circuit comprises another switch, a transformer including a primary and a secondary winding, said switch being disposed in series with said primary winding in the circuit of said electromagnet, a sound head, an amplifier having output terminals, and said sound head and said amplifier being in series with said secondary winding, said sound head recording a signal derived from said circuit of said electromagnet on said sound tape to indicate the start of a scene.

3. The miniature sound tape recorder, as set forth in claim 2, which includes a grounded third switch disposed in parallel with said another switch in said circuit of said electromagnet, so that upon closing said third switch the recording of a signal on said sound tape is avoided.

References Cited in the file of this patent

UNITED STATES PATENTS

| | | |
|---|---|---|
| 2,706,638 | Bruderlin et al. | Apr. 19, 1955 |
| 2,787,669 | Flan et al. | Apr. 2, 1957 |

FOREIGN PATENTS

| | | |
|---|---|---|
| 1,033,863 | France | Apr. 8, 1953 |
| 789,519 | Great Britain | Jan. 22, 1958 |
| 1,085,346 | Germany | July 14, 1960 |